(12) United States Patent
Pannell

(10) Patent No.: US 8,561,344 B2
(45) Date of Patent: *Oct. 22, 2013

(54) MUSHROOM COMPOST COMPACTING SYSTEM AND METHOD

(71) Applicant: Pannell Manufacturing Corp, Avondale, PA (US)

(72) Inventor: Robert T. Pannell, Kennett Square, PA (US)

(73) Assignee: Pannell Manufacturing Corp., Avondale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,105

(22) Filed: Dec. 10, 2012

(65) Prior Publication Data

US 2013/0091766 A1 Apr. 18, 2013

Related U.S. Application Data

(60) Continuation of application No. 13/438,909, filed on Apr. 4, 2012, now abandoned, which is a division of application No. 13/309,071, filed on Dec. 1, 2011, now Pat. No. 8,205,379, which is a division of application No. 12/902,523, filed on Oct. 12, 2010, now Pat. No. 8,069,608.

(51) Int. Cl.
*A01G 1/04* (2006.01)
(52) U.S. Cl.
USPC .......................................................... 47/1.1
(58) Field of Classification Search
USPC ......... 47/1.1, 18, 58.1 R, 58.1 FV, FOR. 100, 47/DIG. 10; 100/152, 102, 153, 210, 155 R, 100/168, 100; 404/103

See application file for complete search history.

(56) References Cited

U.S. PATENT DOCUMENTS

| | | | |
|---|---|---|---|
| 3,292,305 A | 12/1966 | Stengel | |
| 3,856,276 A | 12/1974 | Pannell | |
| 3,881,707 A | 5/1975 | Toto | |
| 3,936,975 A | 2/1976 | de Winter | |
| 3,990,496 A | 11/1976 | Middlebrook et al. | |
| 4,170,432 A | 10/1979 | Pia | |
| 4,267,664 A | 5/1981 | Henke | |
| 4,273,495 A | 6/1981 | Pannell | |
| 4,280,800 A * | 7/1981 | Bunn | 425/62 |
| 4,371,305 A | 2/1983 | Pannell | |
| 4,422,375 A | 12/1983 | Morganti | |
| 4,717,307 A | 1/1988 | Ciuffetelli | |
| 4,776,872 A | 10/1988 | Mulleavy et al. | |
| 5,463,858 A | 11/1995 | Ciuffetelli | |

(Continued)

*Primary Examiner* — T. Nguyen
(74) *Attorney, Agent, or Firm* — Novak Druce Connolly Bove + Quigg LLP

(57) ABSTRACT

A mushroom compost compacting system and method includes a roller assembly mounted to a compost receptacle to form a nip, and a web or conveyor to convey mushroom compost to the nip. Mushroom compost is compacted at the nip from an initial compost height to a final compost height. The roller assembly has a roller, a shaft, and fixtures coupled to each end of the shaft. The fixtures are adjustable to define the roller nip height. In one embodiment, the fixtures are mounted to sleeves that engage the sidewalls of the compost receptacle. In another embodiment, the ends of the fixtures are mounted to a support, which may be a joist or a separate channel extending under the floor portion of the compost receptacle, or which may be a post that forms support structure for the compost receptacle.

10 Claims, 4 Drawing Sheets

(56) References Cited

U.S. PATENT DOCUMENTS

| | | |
|---|---|---|
| 5,511,497 A | 4/1996 | Toto |
| 6,186,083 B1 | 2/2001 | Toto |
| 6,817,286 B2 | 11/2004 | Toto |
| 7,044,233 B2 | 5/2006 | Toto |
| 2004/0065215 A1 | 4/2004 | Toto |

* cited by examiner

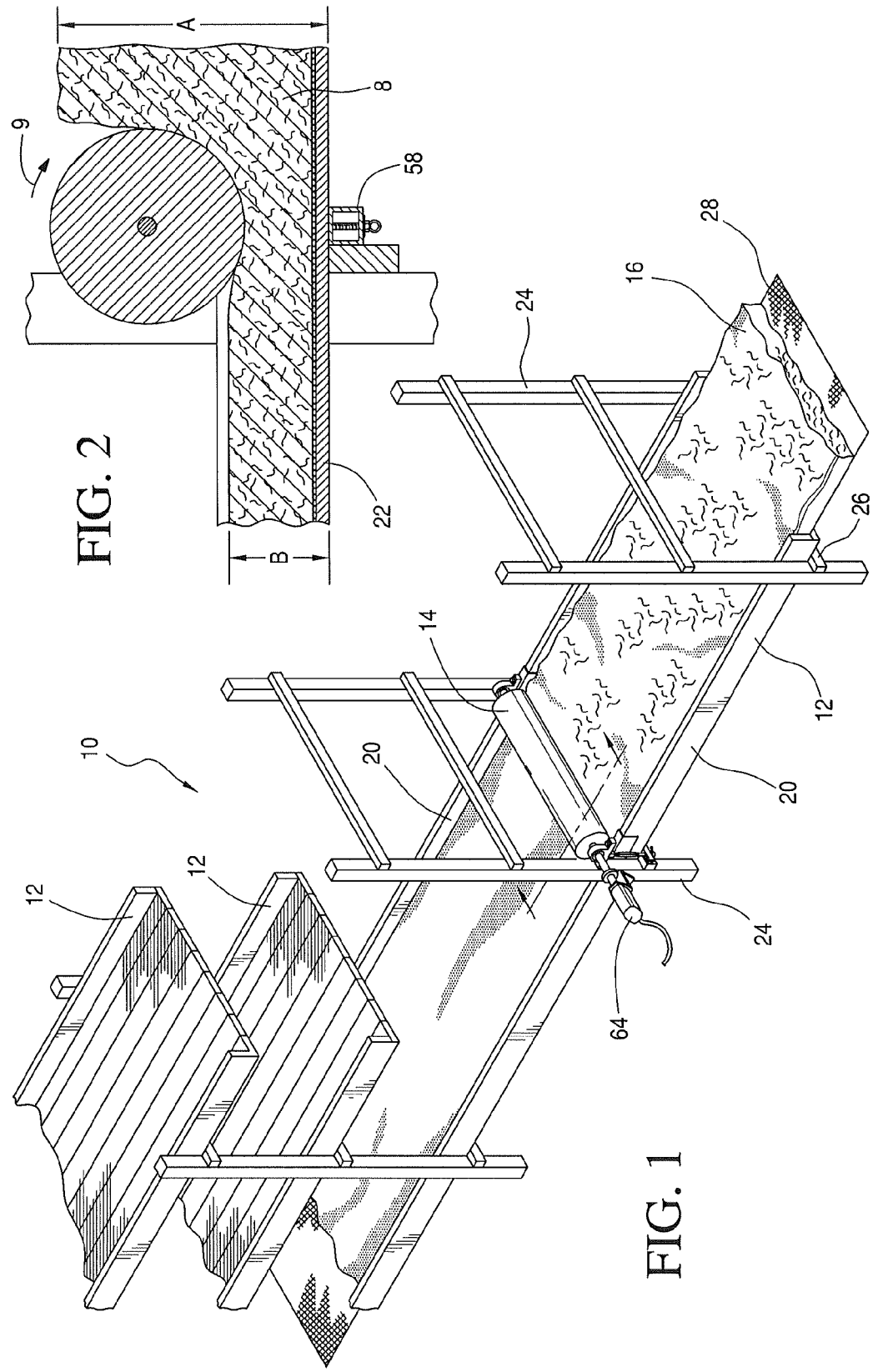

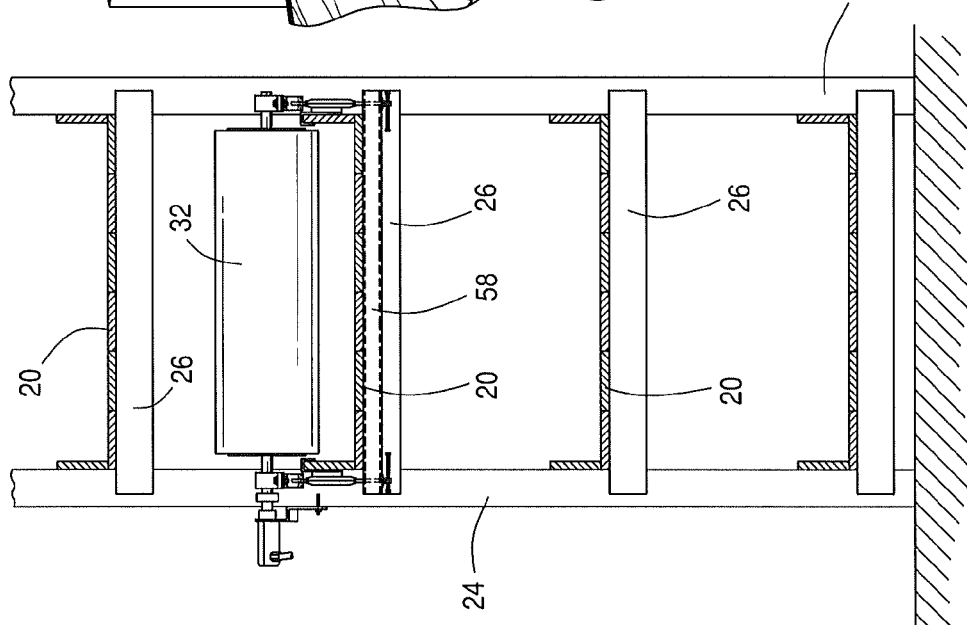
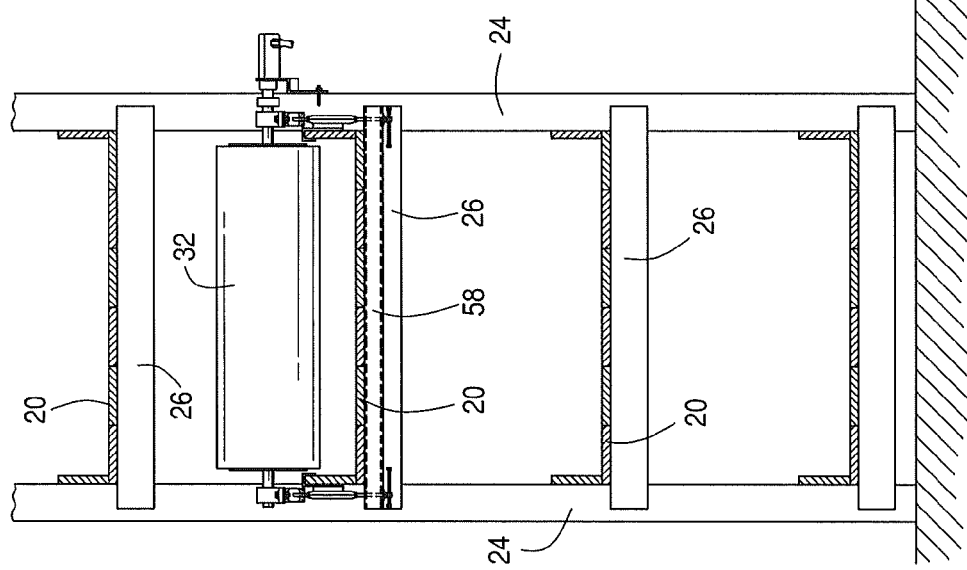
FIG. 7
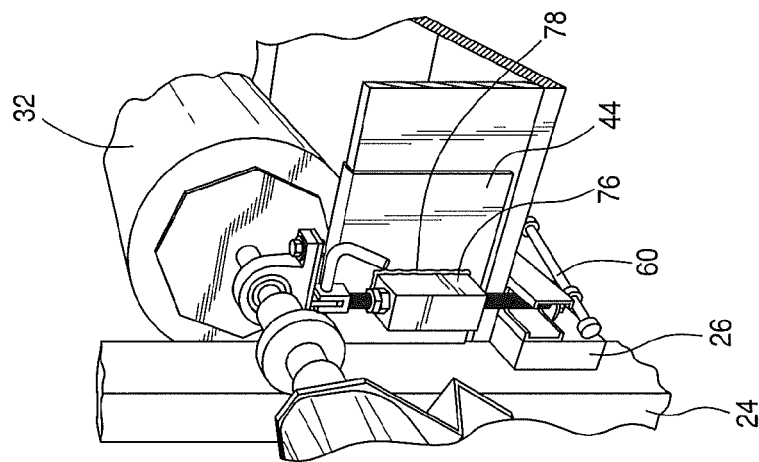
FIG. 8

MUSHROOM COMPOST COMPACTING SYSTEM AND METHOD

CROSS-REFERENCE TO RELATED APPLICATIONS

This application is a continuation of U.S. Ser. No. 13/438,909, filed Apr. 4, 2012, now pending, which was a divisional of U.S. Ser. No. 13,309,071, filed Dec. 1, 2011, now U.S. Pat. No. 8,205,379, which was a divisional of U.S. Ser. No. 12/902,523, filed Oct. 12, 2010, now U.S. Pat. No. 8,069,608.

BACKGROUND OF THE INVENTION

1. Field of the Invention

The field of the invention is mushroom compost compacting systems, and particularly those systems for composting Phase II or Phase III mushroom composts.

2. Background

Mushroom farming comprises generally six steps: (1) Phase I composting; (2) Phase II composting; (3) spawning; or (2a/3a) Phase III composting; (4) casing; (5) pinning; and (6) cropping. The most used and least expensive mushroom compost is straw-bedded horse manure to which nitrogen supplements and a conditioning agent, such as gypsum, are added. After the compost ingredients have been mixed, watered and aerated in Phase I for a requisite number of days, the compost is pasteurized in Phase II. Pasteurization kills insects, unwanted fungi or other pests that may be present in the compost.

Preparing Phase II mushroom compost can be difficult. One reason for the apparent difficulty with this phase is that pasteurization can last up to two weeks, depending upon the production system used. The time required, as well as other difficulties in maintaining temperature control and eliminating pests during this phase have led many mushroom farmers to purchase pre-pasteurized compost. In many cases, the Phase II compost is pre-mixed with mushroom spawn. Alternatively, Phase III compost is pasteurized, pre-mixed with mushroom spawn and spawn run.

When commercial mushroom farmers purchase pre-pasteurized Phase II or Phase III composts, proper compaction of mushroom beds is still necessary to spawn and grow mushrooms. Moreover, regardless the type of receptacle in which the compost is stored during processing, uniform compaction and density of the compost is beneficial for mushroom cultivation. For maximum yield, mushroom beds should have Phase II and Phase III compost density and compaction that fosters gas exchange, keeps compost temperatures sufficiently low, and prevents spawn kill in the next phase of processing.

Presently, commercial mushroom farmers who purchase pre-pasteurized compost introduce the Phase II or Phase III compost into beds by conveyor and attempt to use spawning machines to compact the compost. These machines, however, are not designed to compact to the degree desired for mushroom cultivation. Furthermore, these machines are less than desirable for commercial mushroom farmers because during operation they also chop up the spawn incorporated into the compost, potentially interfering with the next step in mushroom farming.

Other known compacting systems and methods are impractical for commercial use. One such system uses an assembly with rollers and smoothing plates. In this system, mushroom compost is partially compacted after placement into the mushroom bed. The assembly is then horizontally positioned over the bed and manually guided by two operators located on each side of the bed. This system tends to compact only a surface layer portion of the bed. Compaction to some degree has also been performed by hand after placement of compost in the bed. These time-consuming manual systems and methods make clear the need for improved mushroom compaction systems.

While certain aspects of prior art mushroom compacting systems have been discussed, aspects of these systems are in no way disclaimed and it is contemplated that the claimed invention may encompass one or more aspects of the prior art devices discussed herein.

SUMMARY OF THE INVENTION

The present invention is directed toward a mushroom compost compacting system and method. In one embodiment, the system comprises a roller assembly mounted to a compost receptacle, and a web, all of which are configured to compact mushroom compost from an initial compost height to a final compost height. The compost receptacle is configured to receive mushroom compost from any source.

The roller assembly includes a roller, a shaft, and two fixtures to removably mount or affix the roller and shaft to the compost receptacle. The roller is mounted for rotation on the shaft, such as by a through-hole for receiving the shaft. The fixtures are coupled to the shaft for height adjustment of the roller and the shaft in relation to the floor portion of the compost receptacle. Each fixture has (a) a first end that is coupled to one respective end of the shaft, (b) a mid-section that is coupled to a sleeve that seats over a sidewall of the compost receptacle, and (c) a second end that is adapted to mount to a support onto the compost receptacle. The sleeve that is coupled to the mid-section of the fixture is adapted to removably mount onto the sidewalls of the compost receptacle.

The web or liner or conveyor included in the mushroom compacting system is adapted to move under the roller to convey compost to the nip. As the web or liner or conveyor moves under the roller, the mushroom compost is compacted from an initial compost height to a final desired compost height.

Accordingly, a mushroom compacting system and method are disclosed. Advantages of the system and method will appear from the drawings and following description.

BRIEF DESCRIPTION OF THE DRAWINGS

The invention described above will be explained in greater detail below on the basis of embodiments and with reference to the accompanying drawings in which:

FIG. 1 is a top perspective view of a mushroom compost bed with a mushroom composting system;

FIG. 2 is a cross-sectional view of the mushroom composting system shown in FIG. 1 taken along line 2-2 in FIG. 1;

FIG. 7 is a right side view of two roller assemblies operably attached to two mushroom compost beds; and FIG. 8 is a right side view of an alternative fixture for a roller assembly.

DETAILED DESCRIPTION OF THE PREFERRED EMBODIMENTS

Figures 3, 4:
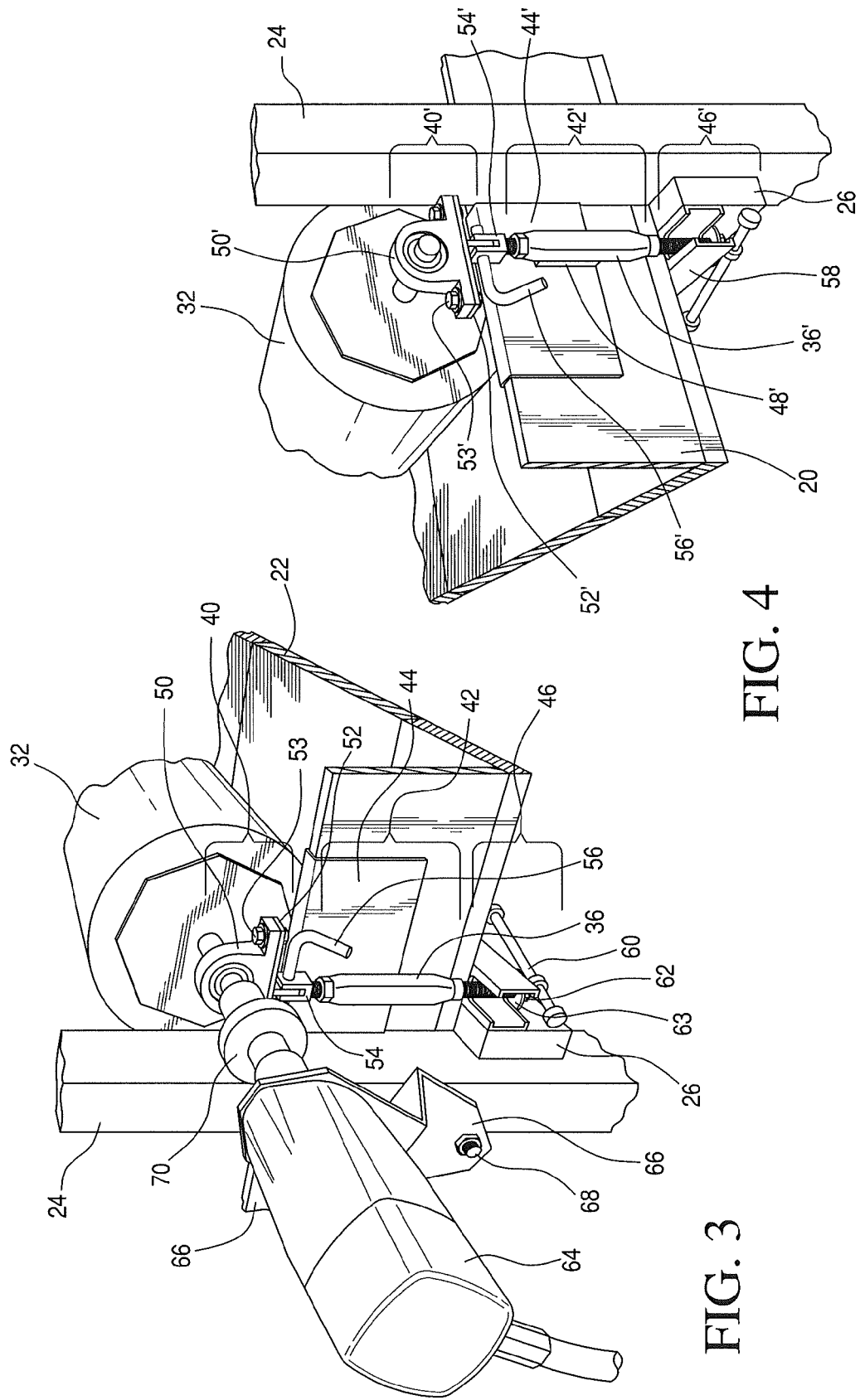
FIG. 3 is a left side partial perspective view of a roller assembly.
FIG. 4 is a right side partial perspective view of the roller assembly of FIG. 3.

Turning in detail to the drawings, FIG. 1. illustrates a mushroom compost bed 10 that includes a series of trays or shelves, herein compost receptacles 12, into each of which mushroom compost 8 is deposited or laid. The mushroom compost 8 may be Phase I, Phase II or Phase III compost. Phase II compost may be pre-spawned, and Phase III compost may be spawn run. The compost receptacle 12 may be any geometric configuration suitable to house mushroom compost 8. In one configuration as shown in FIG. 1, the compost receptacle 12 is an elongated bin, tray, or shelf that has two endwalls 18 (not shown), two sidewalls 20, and a bottom 22. The bottom may be a series of slats or decking running generally lengthwise. Each compost receptacle 12 is supported by vertical posts or members 24 positioned at each corner of the compost receptacle 12 and optionally at intervals along the length of the compost receptacle 12. The vertical posts or members 24 may act as supporting legs for one or more compost receptacles 12. As shown in FIG. 1, the vertical posts or members 24 extend vertically to support other compost receptacles (three tiers shown in FIG. 1). These types of multi-tiered compost receptacles are typical in commercial mushroom farming. For additional support, some compost receptacles also have horizontal members or joists 26 that may be mounted to or connected to the vertical members 24 and extend under the floor portion of the compost receptacle 12. Typically, the compost receptacles 12 are wooden, although any suitable material may be used, including, but not limited to plastic, metal, and composite materials.

The mushroom compost 8 is initially placed into the compost receptacle 12 from any suitable source. Preferably, the mushroom compost 8 is distributed inside the compost receptacle 12 along the length of the compost receptacle using a conveyor system (not shown) that acts on the web or conveyor or liner 28. In one type of conveyor system, at one end of the compost receptacle 12, compost is placed on top of the flexible web or conveyor or liner 28 in the bottom 22 of the compost receptacle 12 at a proximal end thereof. The liner 28 is then pulled from the opposite distal end of the compost receptacle 12, such that the compost 8 is distributed or spread along the length of the compost receptacle 12. Examples of suitable materials for the liner include woven fabrics with a plastic or Teflon coating, or may be polyester.

A mushroom compost compacting system 11 includes a roller assembly 14 that is removably affixed to the compost receptacle 12. Each roller assembly 14 comprises a roller 32, a shaft 34, and two fixtures 36, 36'. The shaft 34 and roller 32 extend laterally over the tray portion of the compost receptacle 12. The roller 32 may be made from a lightweight material such as plastic or aluminum, or may be made of another metal lined on its outer surface with a nylon or Teflon or other sheeting. The roller surface is smooth such that the mushroom compost to be compacted by the roller may move easily under the roller 32. In one embodiment, the diameter of roller 32 is from about 8 to 20 inches. The shaft 34 may be formed of steel; however, any material suitable to support the weight of the roller 32 may be used.

Figures 5, 6:
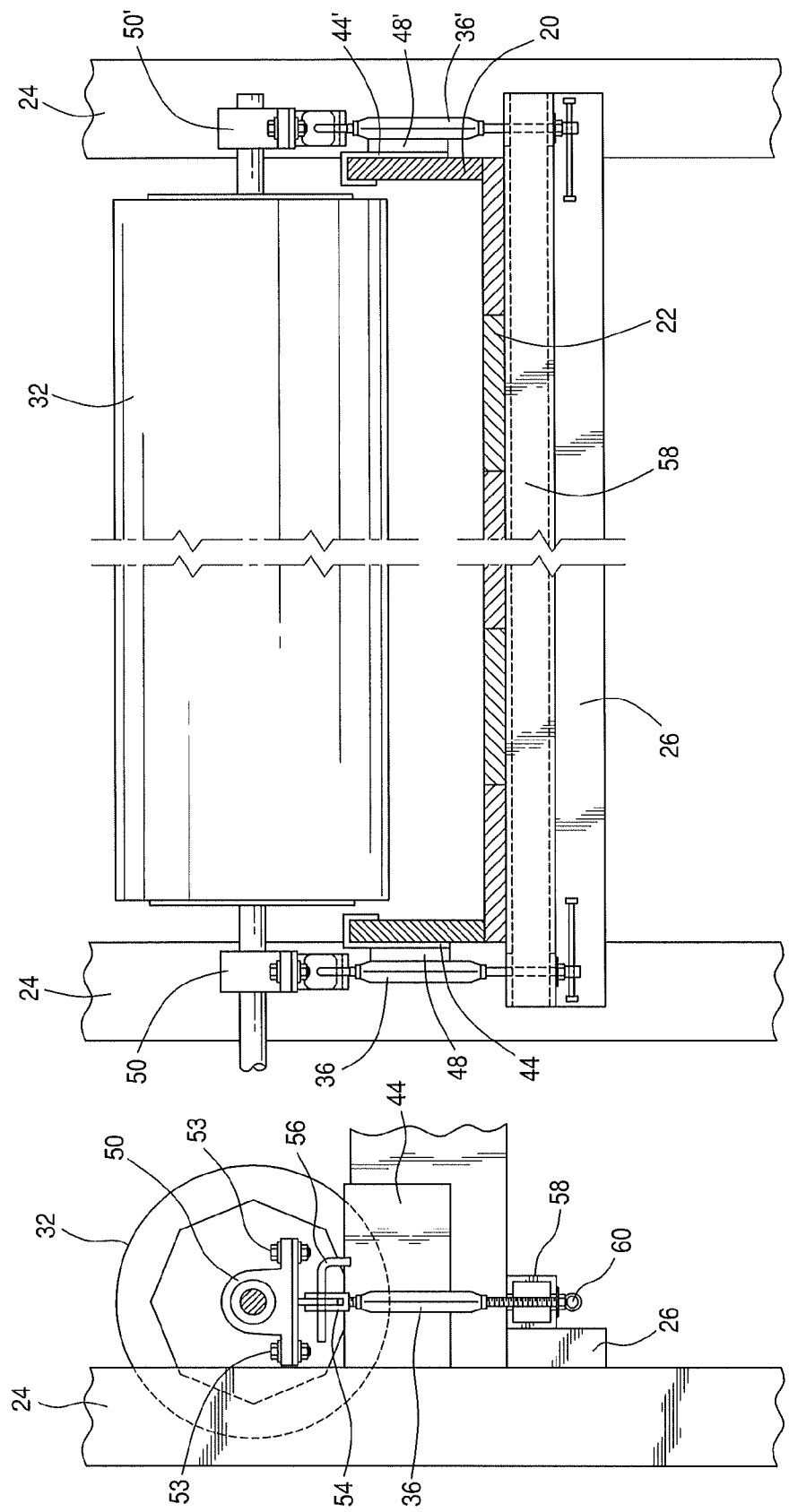
FIG. 5 is a right side view of the roller assembly.
FIG. 6 is a broken front elevation view of the roller assembly.

As shown in FIGS. 3, 5 and 6, the first fixture 36 includes a first end 40, a mid-section 42 coupled to a sleeve 44, and a second end 46. The first fixture 36 is coupled at one end 40 to one shaft end 38 at pillow block bearing 50 and is coupled at the opposite end 62 to a support 58, such as a channel member. The pillow block bearing 50 is then mounted onto a mounting bracket or plate 52, using bolts 53 or other suitable fasteners. The mounting bracket or plate 52 is then welded to a first mounting element 54 which is threaded to the mid-section 42. Disposed within the first mounting element 54 is a pin 56 which may be rotated for adjustment of the first end 40, such that height adjustment of the roller 32 and shaft 34 is possible for compaction of the mushroom compost. As an example, the nip height between the outer circumferential surface of the roller and the floor of the compost receptacle may be from about 2 to about 8 inches. The nip height is set at a distance that is less than the desired compacted height of the mushroom compost.

The mid-section 42 of first fixture 36 may be joined by a spacer 48 or may be welded to a sleeve 44 that is removably mounted or seated or engaged onto a first sidewall 20 of the compost receptacle 12. The second end 42 of the first fixture 36 is threaded to engage the mid-section 42 and to mount onto the compost receptacle 12. Preferably, the second end or opposite end of the first fixture 36 is joined to or mounted to a support, such as channel member 58, that abuts joist or horizontal member 26. In one embodiment, the channel member 58 is a square hollow pipe with a length sufficient to extend under the compost receptacle, and the dimensions of such square may be from 2 inches to 6 inches. In another embodiment, the support may also comprise a solid pipe of suitable cross-sectional shape as desired. The second end 46 is further coupled to a handle element 60 to allow for adjustment of the second end 46. For additional adjustment of the second end 42, washer(s) 63 may be placed between the channel member 58 and the handle element 60.

Referring next to FIGS. 4 and 6, the second fixture 36' may be joined by spacer 48' or may be welded to a sleeve 44'. The second fixture 36' is coupled at one end 40' to one shaft end 38 at pillow block bearing 50' and is coupled at the opposite end 62' to a support 58, such as a channel member. The pillow block bearing 50' is then mounted onto a mounting bracket or plate 52', using bolts 53 or other suitable fasteners. The plate 52' is then welded to a first mounting element 54' which is threaded to the mid-section 42'. Disposed within the first mounting element 54' is a pin 56' which may be rotated for adjustment of the first end 40'.

In an alternative embodiment, however, the second end of the first fixture 36 and the second end of the second fixture 36' are mounted directly to the compost receptacle 12, such as to post 24 or to joist 26 (not shown).

The roller shaft may be turned by hand. Preferably, the first end of the shaft 34 is coupled to a motor 64 for rotation of the roller 32. As shown in FIG. 3, the motor 64 is mounted to a vertical post 24 of the compost receptacle 12 using a mounting plate 66. Adjustment of the mounting plate 66 is achieved through use of a pin 68 that is threaded to the mounting plate 66. Suitable motors include electric and hydraulic motors rated at 1 to 5 HP, or higher HP, although any motor with sufficient capacity to rotate shaft 34 may be used.

The first and second fixtures 36, 36' may be formed from shaped metal, such as steel; however, other materials with sufficient strength to support the roller 32 and shaft 34 may be used.

Once installed, the mushroom compacting system 11 compacts mushroom compost from a first height A to a compacted height B as illustrated in FIG. 2. Gauge boards (not shown) can be inserted adjacent to the side walls of the compost receptacle 12 to help workers place a quantity of mushroom compost onto the conveyor, web or liner 28 at a desired height at one end of the compost receptacle. The roller 32 is rotated in the direction of arrow 9 and the conveyor, web or liner 28 conveys mushroom compost laid thereon to the nip between the roller 32 and the floor portion of the compost receptacle 12. The mushroom compost compacting system 11 can be used with pre-spawned Phase II compost or spawn run Phase III compost without adversely impacting the mushroom crop. As one example, the height A may be about 15 to 16 inches and the height B may be about 6 to 9 inches. A successful degree of compaction is determined at the mushroom grower's discretion. The mushroom compacting system 11 provides means to obtain a more uniform compaction of the mushroom compost at the top, middle and bottom portions of the compacted compost bed.

Upon completing compaction of compost to a desired thickness within a first bin or tray of a mushroom compost bed 10, the mushroom compacting system 11 may be detached from the sidewalls 20 of the compost receptacle 12 and attached to another bin or tray.

As shown in FIG. 7, the mushroom compacting system 11 can include multiple roller assemblies 14 operating concurrently on separate trays or shelves or compost receptacles 12 of one or more compost beds 10, 10'. Each roller assembly 14 is portable, and may be easily disassembled and re-installed to other areas along the length of a compost receptacle 12 or to other trays positioned above or below a first compost receptacle 12 of a compost bed 10. Compost beds may include six or seven compost receptacles 12 mounted in stacked relation. After a lower compost receptacle is prepared and compacted, the next highest compost receptacle may be installed and prepared and compacted for growing mushrooms.

An alternative construction of a fixture 76 is shown in FIG. 8. The fixture 76 is welded at weld seam 78 to the sleeve 44. The fixture 76 may be formed with thicker sidewalls than the fixtures 36, 36' in FIGS. 1-7, and has a generally square configuration in cross-section.

A properly compacted mushroom compost bed using the mushroom compacting system according to the invention can shorten the mushroom grow time cycle by one or two days. The system not only expedites mushroom bed preparation with Phase II or Phase III compost, but also produces a more consistent compost compaction that can lead to enhanced yield in a shorter grow time cycle.

While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A mushroom compost compacting system, comprising:
    at least one roller assembly coupled to a compost receptacle at one fixed location along the length of the compost receptacle, said compost receptacle having mushroom compost therein, wherein the at least one roller assembly comprises:
    a roller adapted for rotation on a shaft;
    at least one first fixture coupled to a first end of the shaft, wherein the first fixture is adapted for height adjustment of the roller and the shaft in reference to a floor portion of the compost receptacle to create a nip between the roller and the floor portion of the compost receptacle;
    at least one second fixture coupled to a second end of the shaft, wherein the second fixture is adapted for height adjustment of the roller and the shaft in reference to the floor portion of the compost receptacle; and
    a web adapted to convey mushroom compost into the nip between the roller and the floor portion of the compost receptacle.

2. The mushroom compost compacting system of claim 1, further comprising a motor coupled to the shaft for rotation of the roller.

3. The mushroom compost compacting system of claim 1, wherein the first fixture comprises a mid-section coupled to a sleeve, wherein the sleeve is adapted to mount onto a support of the compost receptacle.

4. The mushroom compost compacting system of claim 1, wherein the second fixture comprises a mid-section coupled to a sleeve, wherein the sleeve is adapted to mount onto a support of the compost receptacle.

5. The mushroom compost compacting system of claim 1, wherein the first fixture has a first end coupled to the first end of the shaft and a second end adapted to mount onto the compost receptacle or a support thereof.

6. The mushroom compost compacting system of claim 1, wherein the second fixture has a first end coupled to the second end of the shaft and a second end adapted to mount onto the compost receptacle or a support thereof.

7. A portable roller assembly for compacting mushroom compost held in a compost receptacle, said compost receptacle having a length, comprising:
    a roller adapted for rotation on a shaft;
    at least one first fixture coupled to a first end of the shaft, wherein the first fixture is adapted for height adjustment of the roller and the shaft in reference to a floor portion of the compost receptacle having mushroom compost therein to create a nip between the roller and the floor portion of the compost receptacle for compacting the mushroom compost, with said at least one first fixture positioned at one fixed location along the length of the compost receptacle, and
    at least one second fixture coupled to a second end of the shaft, wherein the second fixture is adapted for height adjustment of the roller and the shaft in reference to the floor portion of the compost receptacle, with said at least one second fixture positioned at or near the one fixed location along the length of the compost receptacle,
    wherein said portable roller assembly compacts mushroom compost as said mushroom compost is conveyed through the nip between the roller and the floor portion of the compost receptacle.

8. The roller assembly of claim 7, wherein the first fixture has a first end coupled to the first end of the shaft and a second end adapted to mount onto the compost receptacle or a support thereof.

9. The roller assembly of claim 7, wherein the second fixture has a first end coupled to the second end of the shaft and a second end adapted to mount onto the compost receptacle or a support thereof.

10. The roller assembly of claim 7, further comprising a motor coupled to the shaft for rotation of the roller.

\* \* \* \* \*